INVENTOR.
ROBERT W. SCHOOLEY

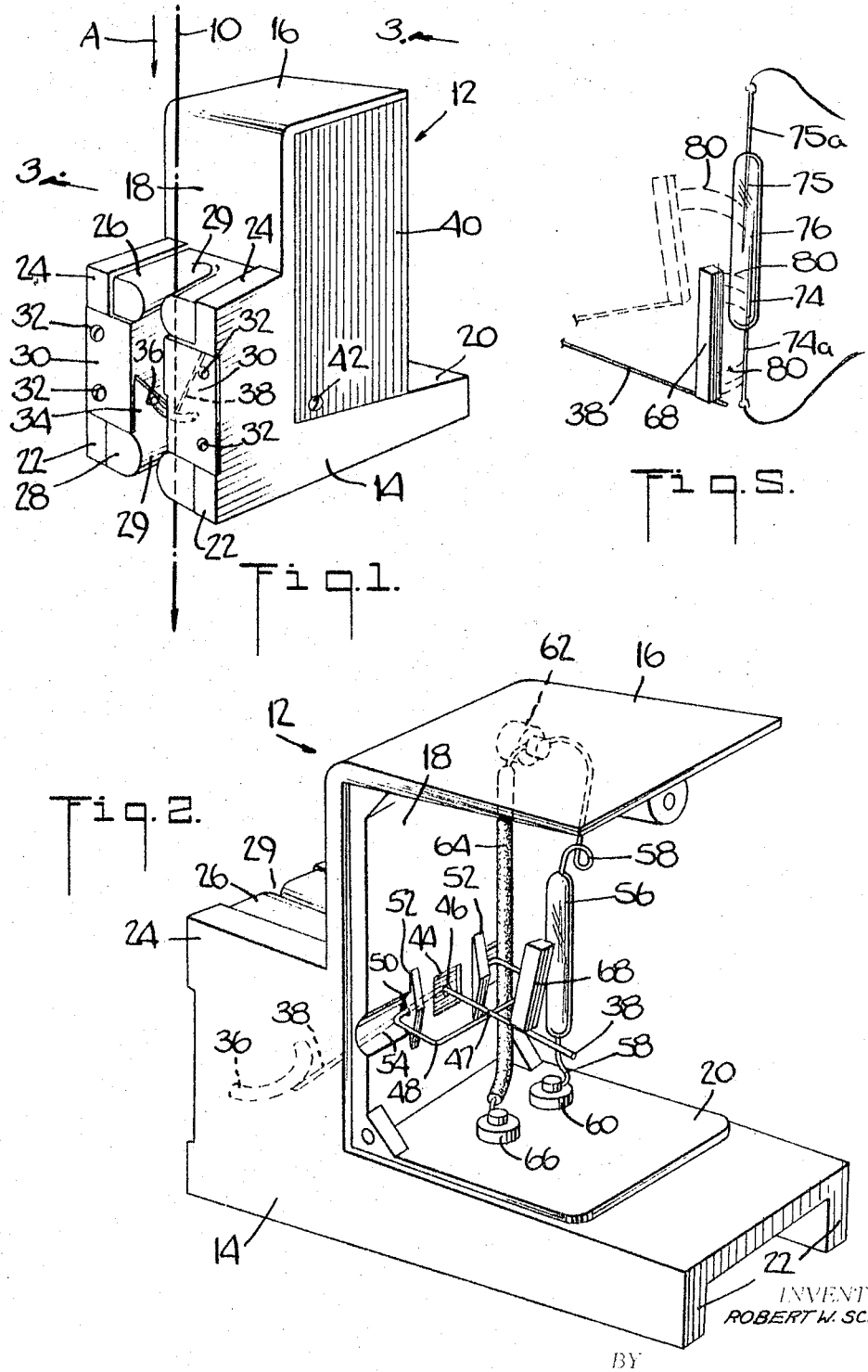

ATTORNEYS

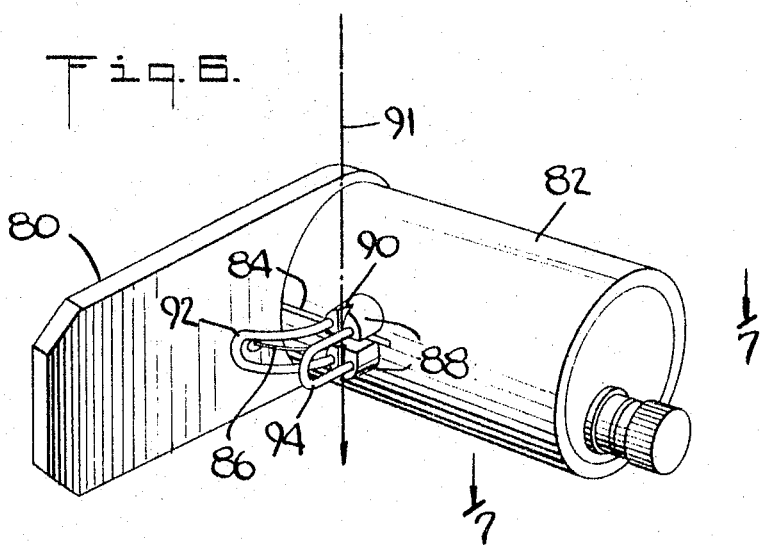
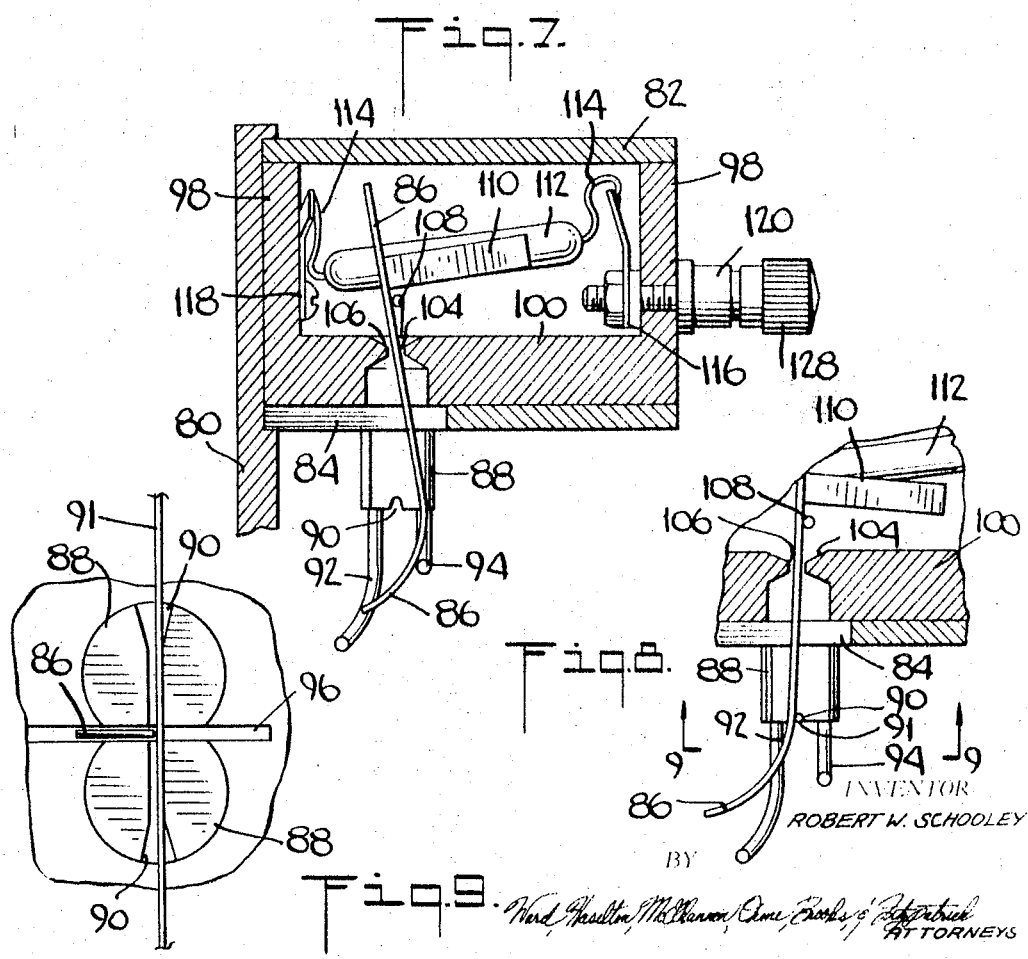

Aug. 19, 1969   R. W. SCHOOLEY   3,462,569
SENSING SWITCH SYSTEMS
Filed July 31, 1967   4 Sheets—Sheet 4
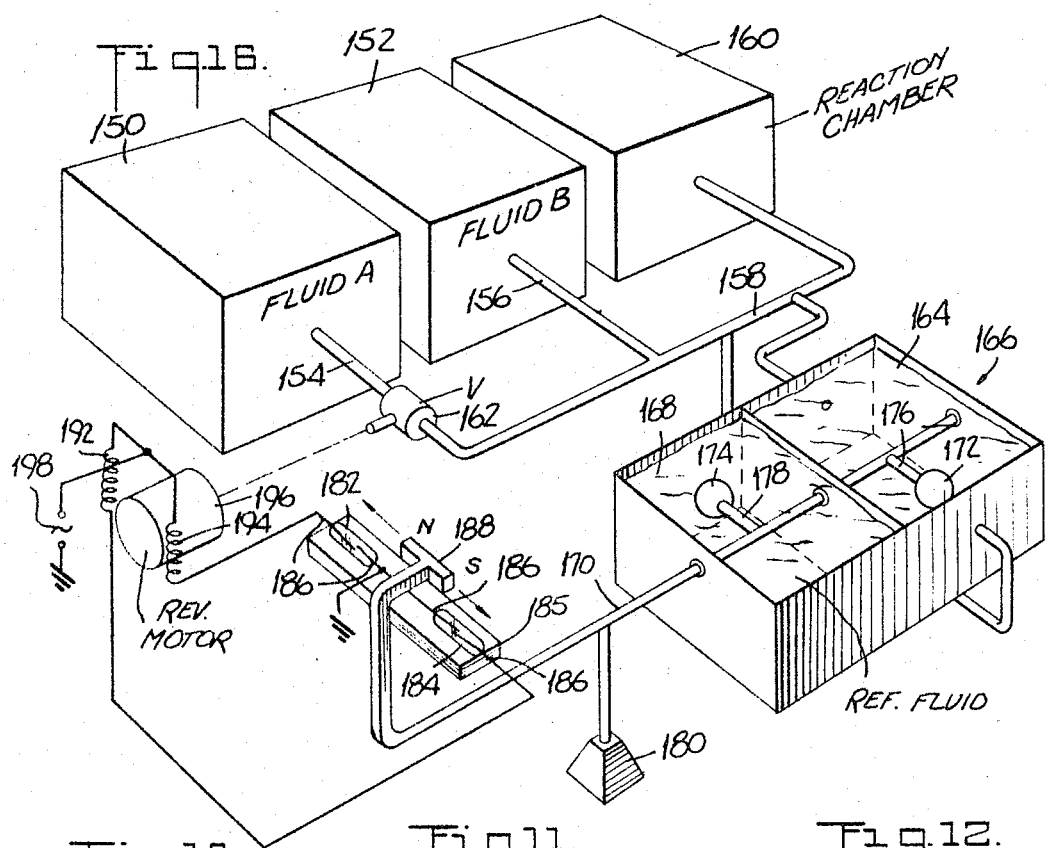
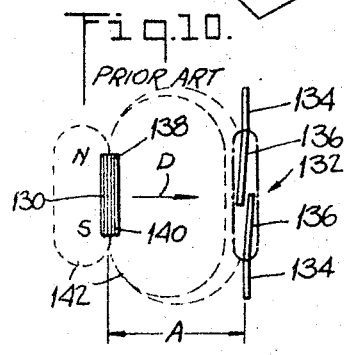
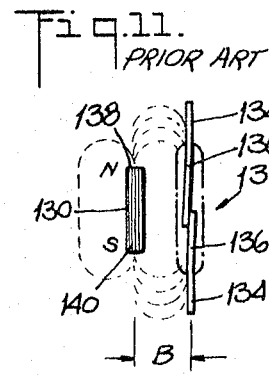
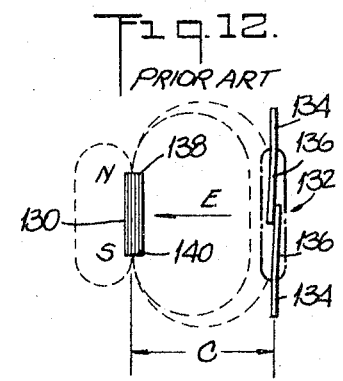
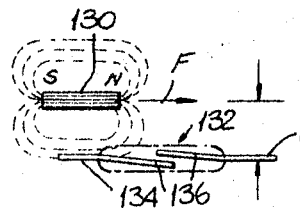
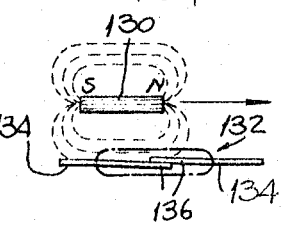
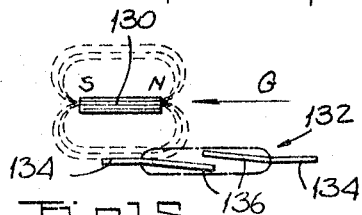
INVENTOR.
ROBERT W. SCHOOLEY
BY
Ward, Haselton, McElhannon, Brooks & Fitzpatrick
ATTORNEYS United States Patent Office 3,462,569
Patented Aug. 19, 1969

3,462,569
SENSING SWITCH SYSTEMS
Robert W. Schooley, R.D. 2, Lebanon, N.J. 08833
Continuation-in-part of application Ser. No. 589,004,
Oct. 24, 1966. This application July 31, 1967, Ser.
No. 657,119
Int. Cl. H01h 3/16, 35/24
U.S. Cl. 200—61.13                                19 Claims

ABSTRACT OF THE DISCLOSURE

Switch systems including off pivot center switch arm mounting means and reed switch-actuating magnet arrangements wherein the magnet poles and switch iron leads are aligned along the path of relative movement to provide a more sensitive yet reliable switching action with a minimum of hysteresis; the switch system is also integrated in a fluid density measurement system.

---

This is a continuation-in-part of application Ser. No. 589,004 filed Oct. 24, 1966, now abandoned.

This invention relates to switching means, and more particularly it concerns sensing switches which are characterized by a high degree of accuracy, low hysteresis and a mimimum of distortion of the object being sensed. The invention also relates to sensing devices for detecting the edge or surface of various non-rigid materials such as paper, cloth, wire, thread, and the like.

The present invention is particularly useful in connection with industries which produce or consume such non-rigid materials in large quantities. For example, where cloth material is being processed, it is often important to be sure that its edges are accurately positioned. Yet mechanical feeler elements by and large do not possess the sensitivity required to feel the edge of the cloth without actually distorting it. Moreover any switch or other signal producing element which might be used in conjunction with the mechanical feeler element also acts to restrict its movement and thus further impairs its sensitivity.

Efforts have been made to develop photoelectric and electrical reactance type detectors for sensing the presence and/or location of non-rigid materials. However, these devices are very sensitive to the presence of lint and dust. Also, their sensitivity varies with age, temperature and other ambient conditions; and they are relatively complex and expensive. The lint and dust problem, moreover, has also plagued the mechanical feeler type sensors.

The present invention overcomes all of the above described difficulties. According to the present invention there is provided a simple, economical sensor of the mechanical feeler type which provides electrical switching based upon the presence and/or position of non-rigid material while imposing only an extremely light pressure on the material. The present invention has thus far made it possible to reduce feeler resistance to well under a hundred milligrams. Moreover, the sensing device of the present invention is essentially free of the problem of dust and lint and does not vary appreciably in sensitivity with time, temperature and other variables.

According to one aspect of the invention there is provided a novel feeler arm mounting arrangement which supports an elongated feeler arm for pivotal movement about a fixed axis. The feeler arm however, is not connected to the mounting means at its pivot point but instead is essentially free and unobstructed at this point. The mounting means itself comprises a generally "C" shaped bracket pivotally connected at its extremities within a housing. The housing is constructed to have a thin wall portion located between the pivot points of the mounting bracket so that the pivot axis lies in the plane of the wall. The wall is provided with a small opening through which the feeler arm passes; and the feeler arm in turn is connected within the housing to the base or midpoint of the mounting bracket. The feeler thus pivots precisely at the location of the opening in the housing wall. Because of this, very little actual displacement is experienced; and the opening may be made minimal in size without obstructing arm movements. As a result, the feeler arm mounting pivots are nearly perfectly shielded from dust, lint and ambient effects.

According to a further aspect of the invention there is provided a biasing arrangement which is extremely sensitive in that it presses very lightly against the material being sensed; and yet at the same time provides positive switching in response to movements of the sensed material. This biasing is achieved by eliminating all gravatational effects through balancing arrangements and by subjecting the system solely to magnetic restraints in a manner such that minimum bias is experienced in the extreme sensing position, while movements of a feeler element away from this position subject it to greater magnetic forces tending to pull it fully to a switching position.

According to a still further aspect of the present invention there is provided a magnetic reed switch actuation arrangement which is characterized by a minimum hysteresis effect. This aspect of the invention permits the sensing of movement of a member past substantially the same location, irrespective of its direction of movement. In the past, because of the large magnetic interaction between the actuating magnet and the magnetic reed switch, the switch contacts would close at one position of the magnet as it moved in one direction; but, as the magnet moved back in the opposite direction the switch contacts would not reopen again until the magnet had moved a substantial distance past its original switch contact closing position. The discrepancy between switch opening and closing, in addition to being large, was not predictable with any substantial degree of reliability. Moreover, the large magnetic interaction between the switch and magnet would often pull the magnet toward the switch so that the true position of the magnet could not be measured unless it was very heavily restrained.

The present invention makes it possible for a magnetic reed switch to be used as a position indicator in devices where an object whose position is to be indicated may approach that position from different directions. This is achieved in the present invention by aligning and orienting the actuating magnet and the magnetic reed switch such that they move substantially parallel to each other in the vicinity of switch actuation. This effectively cancels variations in magnet-switch interaction so that the field configuration which controls the switch contact actuation remains the same relative to the magnet and is only minimally affected by the opened or closed condition of the switch contacts.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefor, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a perspective view of a sensing apparatus forming a first embodiment of the present invention;

FIG. 2 is an enlarged perspective view of the sensing apparatus of FIG. 1 showing the internal construction thereof;

FIG. 5 is an enlarged fragmentary view, partially broken away, showing a modified switch arrangement;

FIG. 6 is a perspective view of a sensing apparatus forming a second embodiment of the present invention;

FIG. 7 is a section view taken along lines 7—7 of FIG. 6;

FIG. 8 is an enlarged fragmentary view showing a portion of the arrangement of FIG. 7 in sensing position;

FIG. 9 is a view taken along lines 9—9 of FIG. 8;

FIGS. 10–12 are schematic representations of a prior art switch-magnet arrangement in various conditions of actuation and deactuation;

FIGS. 13–15 are schematic representations of a switch-magnet according to the present invention in various conditions of actuation and deactuation; and FIG. 16 is a schematic illustration of a self regulating fluid control system incorporating the principles of the present invention.

Figure 3:
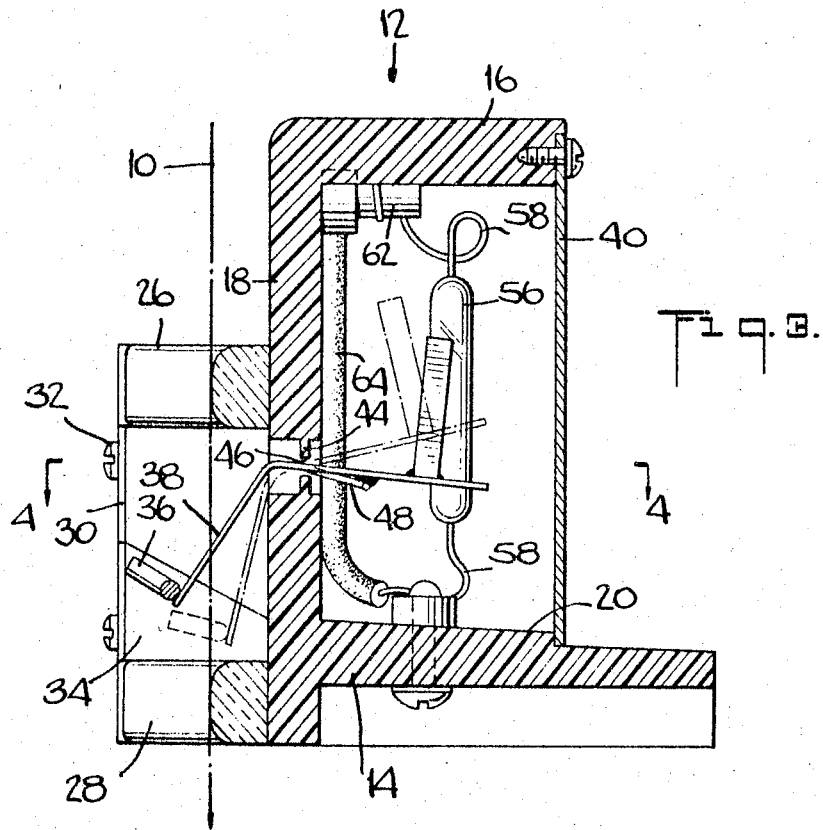
FIG. 3 is an enlarged section view taken along lines 3—3 of FIG. 1.

As shown in FIG. 1, an elongated filament or edge 10 of a non-rigid material moves downwardly in the direction of an arrow A through a sensing apparatus 12 constructed according to the present invention. The sensing apparatus 12 is made up of a frame 14 which may be formed or molded of any suitable substantially rigid material such as metal or plastic. As shown, the frame 14 comprises a top wall 16, a front wall 18 and a lower floor 20. A pair of legs 22 protrude downwardly from and extend along each side of the lower floor 20. Additionally, a pair of forward supports 24 extend forwardly out from the front wall 18 at each edge thereof. Upper and lower guide blocks 26 and 28 of generally U-shaped configuration fit between the forward supports 24 and against the front wall 18. These guide blocks are preferably formed of a hardened low friction material such as titanium oxide or the like, and they serve to guide the edge 10 of the strand or filament being sensed in a proper direction through a generally U-shaped channel 29 formed by these blocks at the front of the apparatus.

A pair of guide plates 30 are attached to the front of the forward supports 24 by means of screws 32. These guide plates serve to provide support and spacing for the guide blocks 26 and 28. The guide plates 30 are formed of sheet material and are bent around to conform to the U-shaped openings defined by the guide blocks. Openings 34 are formed in the guide plates 30 to accommodate a movable feeler element 36 for in and out movement in the U-shaped channel 29. The openings 34 further serve to limit the extent of in and out movement of the feeler element 36.

The feeler element 36 is held inwardly in the channel 29 by the edge 10 while it moves downwardly through the channel. Whenever the edge 10 moves out from the channel, either through breakage or material movement, the feeler element 36 will move outwardly and a switching action will take place.

The feeler element 36 like the guide blocks 26 and 28, should be of a low friction material. Also it should be light in weight so as to respond to very small force increments. Alumina has been found to provide these desired characteristics for the feeler element 36.

As shown in dotted outline, the feeler element 36 is mounted on the end of a wire-like feeler arm 38 which protrudes into the channel 29 from behind the front wall 18.

A generally U-shaped sheet metal cover 40 extends around the back of the frame 14 between the top wall 16 and the lower wall 20 and is held in place by means of screws 42.

Turning now to FIG. 2 it will be seen that the front wall 18 is formed with a thin wall region 44 through the center of which there is provided a small opening 46. As shown in FIG. 2, the feeler arm 38 extends through the opening 46 into the region behind the front wall 18. The feeler arm 38, which is of relatively rigid stainless steel wire or piano wire, is attached as by soldering or welding, to the mid-point 47 of a C-shaped mounting bracket 48 located within the region behind the front wall 18. As can be seen, the ends of the mounting bracket 48 face each other and fit into corresponding bearing journals 50 which are supported on lugs 52 formed on the inside surface of the front wall 18. The inside surface of the front wall is also provided with a recess 54 which allows the bearing journals to be located upon a line which passes through the thin wall region 44. The purpose for this arrangement will be described more fully hereinafter.

A magnetically actuable reed switch 56 is mounted in vertical position between the top wall 16 and the lower floor 20 alongside the path of movement of the feeler arm 38. The reed switch 56 is electrically connected by means of wires 58 to terminal posts 60 and 62 mounted respectively on the lower floor 20 and the front wall 18. It will be noted that the wires 58, in addition to providing electrical interconnection between the reed switch 56 and the terminal posts 60 and 62, also provide mechanical support for the reed switch. Moreover, this support is of such a nature as to allow the reed switch 56 to be moved (by bending the wires 58) to a desired position relative to the feeler arm 38. A return wire 64 is interconnected between the upper terminal post 62 and a second lower terminal post 66 located on the lower floor 20. This permits electrical connection by means of wires not shown, which can pass from between the legs 22 under the lower floor 20 to point external to apparatus remote from the sensing apparatus 12.

An elongated magnet 68 is mounted in upright position upon the feeler arm 38 in the vicinity of the reed switch 56. The magnet 68 moves with the feeler arm 38 and changes its position relative to the reed switch 56 thereby to control operation of the switch.

Figure 4:
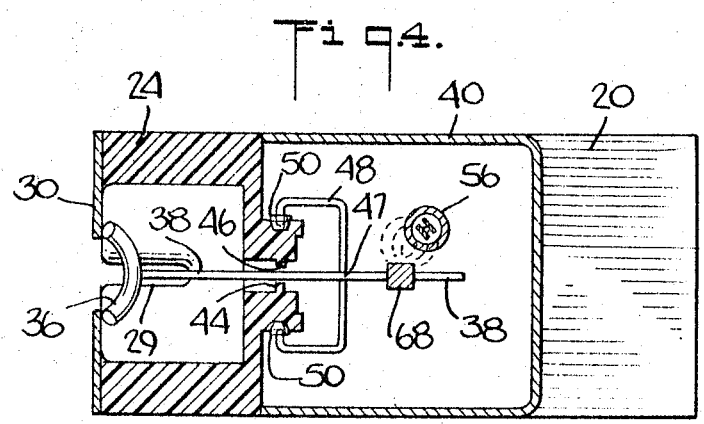
FIG. 4 is a section view taken along lines 4—4 of FIG. 3.

Turning now to FIGS. 3 and 4, it will be seen that the openings 34 in the guide plates 28 serve to limit the in and out movement of the feeler element 36 to two distinct positions as shown respectively in solid and dotted outline. When the edge 10 of a filament or other non-rigid material to be sensed passed along the channel 29 in the direction of the arrow A, it impinges upon the feeler element 36 causing it to move to its dotted outline position as shown in FIG. 3. In this position, the feeler arm 38 is caused to move upwardly, thus bringing the elongated magnet 68 to a position removed from the reed switch 56. Should the edge 10 of the filament move away from its prescribed path, the feeler element 36 will move outwardly to its solid line position, thus bringing the feeler arm 38 to a corresponding position such that the elongated magnet 68 is moved closer to the reed switch 56. This in turn will cause the contact elements in the reed switch to close thereby enabling it to produce an electrical output signal.

As indicated previously, the bearing journals 50 are arranged such that the ends of the mounting bracket 48 lie upon a line passing through the thin wall region 44 through which the small opening 46 extends. As a result of this, the pivot axis of the feeler arm 38 is located precisely at the opening 46. Consequently, the amount of up and down movement undergone by this portion of the feeler arm 38 is minimal. As can be seen in FIG. 3, if the thin wall region 44 were moved either to the left or to the right with respect to the pivotal axis of the feeler arm 38, then the opening 46 would have to be larger to accommodate the increased amounts of up and down movement of the feeler arm 38. However, because of its particular location on the pivot axis, the opening 46 may be made minimal in size without affecting the movement of the feeler arm 38. Because of this, the internal components of the device i.e., the switch mechanism and more importantly, the mounting mechanism for the feeler arm 38 is nearly completely protected from ambient effects and from dust, lint and the like. Moreover, this mounting arrangement, while nearly completely isolating the bearing journals 50 from the feeler element 36, still permits a perfectly balanced condition about the pivot axis which extends through the thin wall region 44 and the opening 46.

As can be seen in FIG. 4, the pivot construction for the mounting bracket 48 is similar to the jeweled pivot arrangement in a conventional watch movement except that in the arrangement of the present invention, the relative positions of the various pivoting elements is reversed. That is, the pivotal mounting bracket 48 extends around so that its ends enter and engage the bearing journals 50 on surfaces which face away from each other rather than toward each other as in conventional mounting arrangements. The bearing journals 50 themselves however are similar to those of conventional watch jewel type journals; and as such, they comprise a jewel like element of hardened material.

The elongated magnet 68 is arranged on the feeler arm 38 is such a position that it counterbalances the feeler element 36 and eliminates or neutralizes all torques about the pivot axis. As a result, the device is rendered essentially free of gravity so that the edge 10 does not have to overcome any forces caused by the weight of either the magnet 68, the feeler element 36, the feeler arm 38 or the mounting bracket 48.

During operation of the above described device, the magnet 68 moved toward and away from the switch 56 as the feeler element 36 moves out and in. The magnet 68 produces lines of magnetic flux 70 (FIG. 4) which, when the magnet is closely aligned with the switch 56, interact with a pair of switch contacts 72 contained within the switch, and causes them to come together. These contacts, which are essentially conductive, are thereby caused to complete a circuit for producing an electrical signal.

The magnetic flux 70 produced by the magnet 68 is insufficiently strong to close the contacts 72 when the magnet is in its dotted line position away from the switch 56. Thus the contacts are held apart by their own resilient bias and thereby they maintain an open electrical switch.

In order for the feeler arm to move outwardly when the edge 10 being sensed moves out of position in the channel 29, some bias must be furnished. This bias is obtained by the interaction of the flux 70 with the magnet 68 and with the switch contacts 72. Although this flux is insufficient to close the contacts 72 when the magnet is in its dotted line position, it is nevertheless strong enough to impose a small but finite force on the magnet 68 urging it toward the switch 56. Since, as stated above the feeler element-feeler arm-magnet system is essentially balanced, it will pivot in response to these minute magnetic attraction forces. These forces moreover exert their smallest resistance when the device is in sensing position, i.e., when the feeler element 36 is held inwardly and the magnet 68 is away from the switch 56. Thus the reaction of the apparatus 12 to the non-rigid edge 10 being sensed is minimal. On the other hand, any movement of the edge 10 which is sufficient to allow outward movement of the feeler element 36, will allow the magnet 68 to move closer to the switch 56 thus greatly increasing their mutual attraction. This produces a snap action effect whereby the magnet 68 is brought suddenly to its solid line position at which it causes the switch contacts 72 to come together.

It will be appreciated that by balancing all movements about the pivot axis of the feeler arm 38; and by using magnetic biasing in the manner shown, a very sensitive yet very positive switching action is achieved. This is different from the situation with conventional spring biased switches which exert their greatest bias force when the sensing element is in its extreme sensing position, and which exert their minimum force when the sensing element moves in the region where switching is to take place.

For certain situations, such as filament tension control, it may be desired to maintain minimum feeler arm resistance when the switch contacts are closed. FIG. 5 illustrates an arrangement for achieving this. As shown in FIG. 5, a magnetic reed switch 73 is provided with a pair of elongated iron reed elements 74 and 75 having extensions 74a and 75a, also of iron, which protrude out the ends of a glass envelope 76. A bar magnet 68 is mounted on a feeler arm 38 as in the previous embodiment. However it will be noted that in the present case, the feeler arm 38 is arranged such that when the magnet 68 is closest to the reed switch 73 and thus is most forcibly attracted to the switch, the flux coupling 80 from the magnet 68 engages only one of the reed elements 74, and not the other. On the other hand, when the feeler arm 38 moves the magnet 68 to its dotted line position as shown in FIG. 5, the flux coupling 80 urging the magnet 68 toward the switch 73 is diminished because of the greater distance between the magnet and switch. Yet the magnet 68, in addition to moving away from the switch 73, also moves upwardly along the switch so that while the total flux linkage is weakened, it nevertheless now couples both reed elements 74 and 75 causing them to close.

FIGS. 6–9 show a modified version of the present invention suitable for detecting the presence of non-rigid filaments which have no appreciable tension. In this embodiment, use is made of the slight bending or shear resistance of such filaments in order to detect their presence. As shown in FIG. 6, there is provided a flat metal base member 80 having a tubular cylindrical casing 82 extending outwardly from one surface of the base member toward one end thereof. The casing 82 is provided with a longitudinal slot 84 which extends upwardly from the base member 80. A curved wire-like feeler arm 86 protrudes out through the slot 84 and is movable back and forth therein toward and away from the base member 80. A pair of outwardly protruding supports 88 are positioned on either side of the slot 84 and these supports are grooved as indicated at 90 to allow a filament 91 of thread or other non-rigid material to pass through and across the slot 84. A pair of heavy wire guide loops 92 and 94 each extend across the supports 88 on opposite sides of the grooves 90 to provide a guide like entrance for the filament 91 to move into the grooves 90. Turning now to FIGS. 8 and 9, it will be seen that when the filament is in the grooves 90, it serves to hold the feeler element 86 in a leftward position. When however the filament is broken or moves out of the grooves 90, the feeler element 86 will as indicated in FIG. 7, move rightwardly to its biased position.

The device shown in FIGS. 6–9 may be made so sensitive to filament position that no tension whatever need be placed upon a filament in order for its presence to be detected. The characteristic of the filament required to achieve this detection need only be its own inherent resistance to bending or shearing. Thus, as shown in FIG. 9, the feeler element 86, in pushing against the filament, attempts to cause it to bend into a U-shaped configuration. The resistance of the filament to this bending action is achieved not by tension thereon, but instead it is achieved by virtue of the inherent bending resistance of the filament. This bending resistance is maximized and is effectively converted to a shearing resistance by causing the gap between the support elements 88 (shown at 96), to be of only slightly greater width than that of the feeler element 86 itself.

The internal construction of this second embodiment is basically similar to that of the first described embodiment. In the present case, as shown in FIG. 7, there is provided an internal structure comprising two disc shaped end portions 98 which fit snugly into the opposite ends of the casing 82. These two end portions are mounted on a front support element 100 which extends up along the inside of the casing 82 immediately adjacent its inner surface in the region of the slot 84.

The front support element 100 is provided with a thin wall portion 104 in the vicinity of the slot 84 of the casing 82. The wall portion 104 in turn is provided with a small opening 106 through which the feeler arm 86 protrudes. The feeler arm 86 in turn is mounted on a generally U-shaped mounting bracket 108 and this in turn is pivotally mounted on the front support element 102 in the same manner that the mounting bracket 48 of the preceding embodiment is mounted. As in the preceding embodiment, there is provided an elongated magnet 110 attached to the feeler arm 86 within the casing 82 so as to move with movements of the feeler arm 86. The magnet 110 moves with respect to a magnetically actuable reed switch 112 located within the casing 82. The switch 112 is attached by means of wires 114 to upper and lower terminals 116 and 118. Electrical connections may be made by grounding the base member or mounting it against a grounded connection and attaching a sensing wire (not shown) to a terminal connection 120 which is operated by means of a thumb screw 128.

It will be appreciated that the embodiments of FIGS. 6–9, like the original embodiments, provides a unique pivotal mounting for a feeler arm element such as to protect it from adverse ambient conditions and from dust, lint and the like. Additionally, the arrangement of this second embodiment also permits a very high sensitivity in that it is biased solely by the magnetic effects produced between the elongated magnet 110 and the reed switch 112. Thus there are no resilient restraining means which act upon the positional movements of the feeler arm 86; nor is the arm 86 affected in any manner by gravitational forces.

The control of the path of magnet movement, as in the embodiments of FIGS. 2–5, to achieve a desired relationship between magnet-switch attraction provides an additional advantage in that it minimizes hysteresis effects in switching. It will be noted that in those embodiments the poles of the magnet are aligned nearly parallel with the iron leads and contacts of the switch, and that the path of magnet movement is generally along the direction in which the magnet poles and switch leads are extended. As a result of this the magnetic coupling between the magnet and switch is substantially independent of whether the switch contacts are opened or closed. Because of this, the magnetic coupling between the magnet and switch will not increase sharply due to the closing of the switch contacts. Thus the switch contacts can be made to reopen at a magnet position which is very close to the position which the magnet occupied when switch closure occurs.

This feature of the present invention is illustrated in FIGS. 10–15. FIGS. 10–12 illustrate the conventional movement of an actuating magnet 130 with respect to a reed switch 132. The reed switch 132 has vertically extending iron lead 134 and contacts 136; and the magnet 130 has vertically extending north and south poles 138 and 140 which create a magnetic field pattern illustrated by the dotted line arrangement 142. As can be seen in FIG. 10 this magnetic filed pattern is stronger in the direction of the switch 132 since its leads 134 provide low reluctance paths for the magnetic flux. Moreover, the gap between the switch contacts 134 is directly in the path of the major portion of the magnetic flux from the magnet 130, this resulting from the fact that the iron leads 134 and switch contacts by their low reluctance, concentrate the magnetic flux.

The magnet 130 moves reciprocally along a path in the direction of the arrow D, this being transverse to the direction of the magnet poles and switch leads.

When the magnet is separated from the switch by a distance A as illustrated in FIG. 10, there is insufficient magnetic flux in the gap between the switch contacts 136 to close them; and so they remain opened. When the magnet moves to the position shown in FIG. 11 however, so that it is at a distance B from the switch, the overall magnetic coupling between the switch and magnet increases and the flux in the gap between the switch contacts 136 becomes sufficient to close them. This contact closure however, since it is directly in the path of substantially all the magnetic flux, produces a very pronounced reduction in the reluctance of the overall magnetic circuit. As a result, the magnetic coupling between the switch and magnet sharply increases at the point of contact closure even without further movement of the magnet.

Now when the magnet 130 is moved back, as shown in FIG. 12, in the direction of the arrow E, the closed switch contacts 136 maintain a path of relatively low reluctance in the overall magnetic circuit. Thus even though the distance between the magnet and switch increases to a distance C, as indicated in FIG. 12, the switch contacts may remain closed. It will be appreciated therefore that with a prior art switch-magnet arrangement, the opening and closing of the switch-contacts depends not only upon the relative positions of the magnet and switch, but also upon the direction of relative movement between them.

The provision of a path of magnet movement along the direction of the magnet poles and switch leads, instead of transverse thereto, serves to control the switching action so that it is more nearly solely a matter of relative switch-magnet positions. This arrangement, which the present invention employs, is illustrated in FIGS. 13–15. As shown in FIG. 13, the magnet 130, moves along a path, indicated by the arrow F, which is in the direction of extension of the switch leads 134 and magnet poles 138 and 140. Since the magnet moves no closer and no farther from the iron leads 134 of the switch, the overall magnetic coupling between the magnet and switch remains essentially unchanged. Thus even when the magnet 130 moves to the position illustrated in FIG. 14, so that the flux in the gap between the switch contacts 136 is great enough to close them, the overall magnetic coupling between the switch and magnet is not substantially changed. This is because the gap between the opened switch contacts 136 passes only a small portion of the total magnetic flux, the major portion being passed by the switch lead closest to the magnet.

Since the magnetic coupling between the magnet and switch is essentially independent of the opened or closed condition of the switch contacts, the magnetic flux flowing through them is controlled nearly exclusively by the position of the magnet. Thus when the magnet moves back, as illustrated in FIG. 15, in the direction of the arrow G, it will permit the switch contacts to reopen at a location very close to the position at which it had caused them to close.

The reduction of switch hysteresis as above described permits closer control of various self regulating systems. Such a system is illustrated schematically in FIG. 16.

In the system of FIG. 16 first and second fluids of different density are drawn from separate vessels 150 and 152 via separate pipes or conduits 154 and 156; and these fluids are mixed in a common pipe or conduit 158 and directed into a reaction chamber 160. The ratio or relative percentage of the fluids going into the reaction chamber may be controlled by adjustment of a valve 162 in the pipe 154.

Since the fluids are of different density, their ratio in the mixture going into the reaction chamber 160 may be ascertained by measuring the density of the mixture. This is dones as shown in FIG. 16 by tapping off a sample of the fluid from the common pipe 158 and passing it through a measurement cell 164 in a sensing chamber 166. The sensing chamber 166 is also provided with an adjacent reference cell 168 in which a reference fluid or fluid of standard density is maintained.

A common shaft 170 passes through the two cells 164 and 168 and is mounted for rotation about its longitudinal axis. A pair of fluid displacement elements 172 and 174 are mounted on the ends of arms 176 and 178 which extend in opposite directions from the shaft 170 and which maintain each element immersed in the fluid of a different cell. The buoyant effects of the fluids in the two cells cause their associated fluid displacement elements to exert opposite torques on the shaft 170. The buoyant effects of the fluids depend upon their densities, and accordingly as the density of the fluid in the first cell 164 changes, it will cause the shaft 170 to rotate. The rotation of the shaft 170 may be regulated by means of a pendulum weight 180 which extends downwardly therefrom outside the cells 164 and 168.

The degree of shaft rotation is sensed according to the present invention by means of a switch-magnet arrangement. This includes a pair of magnetically controllable reed switch 182 and 184 mounted on a base 185 and arranged with their leads 186 in alignment. A magnet 188 is mounted on a support rod 190 attached to the shaft 170 to move back and forth in the direction of the switch leads 186 as the shaft 170 rotates.

The two switches 182 and 184 are arranged to convert different windings 192 and 194 of a reversable electric motor 196 to a source 198 of electrical power. When either switch closes it causes the motor 196 to rotate in a given direction. The motor 196 is connected to adjust the valve 162.

In operation of the device, the density of the fluid mixture from the two vessels 150 and 152 is continually sensed in the sensing chamber 166. When the density becomes greater or less than the standard established by the fluid in the reference cell 168, the buoyant influence of the fluids upon the fluid displacement elements 172 and 174 will cause one to rise and the other to fall, and thus rotate the shaft 170. This in turn will cause the magnet 188 to move with respect to the switches 182 and 184. Eventually the magnet will be moved to a position such that one of the switches is closed. This will turn on the motor 196 and cause it to adjust the valve 162 in a direction to change the ratio of the fluids so that the density of the mixture is brought into accord with the reference fluid.

The arrangement of FIG. 16 is essentially a closed loop regulator system; and the initiation and termination of fluid ratio adjustment is effected according to the position of the magnet 188. Since the magnet-switch arrangement of FIG. 16 is in accordance with the present invention and reduces hysteresis to a minimum, a very high degree of control may be achieved without danger of hunting, overshoot or self oscillation of the system.

It will be appreciated that with the particular switch-magnet arrangement of the present invention, i.e. with the switch leads and magnet poles aligned substantially parallel to their path of relative movement, the magnetic coupling between the switch and magnet remains substantially unchanged as the magnet moves between its switch closing and opening positions. As a result there is virtually no energy exchange or work done other than that needed to overcome the magnet's inertia and the friction of its support structure. In prior art arrangements the movement of the magnet involved the changing of its magnetic coupling to the switch; and this required an energy exchange either to start or to stop the magnet's movement. In the present invention no such energy exchange is present and the work involved in moving the magnet and actuating the switch is minimized. Accordingly a very sensitive yet reliable switching is obtained.

Of course, as explained in connection with FIG. 5, it is possible, by providing slight adjustments between the magnet-switch orientation and their path of movement, to obtain predetermined patterns of energy exchange so that the work needed to move the magnet can be made to increase or decreease at various magnet positions.

Having thus described the invention with particular reference to the preferred forms thereof, it will be obvious to those skilled in the art to which the invention pertains, after understanding the invention, that various changes and modifications may be made therein without departing from the spirit and scope of my invention.

What is claimed as new and desired to be secured by Letters Patent is:

1. A sensing switch device comprising a feeler member, means mounting said feeler member for free movement between first and second positions, magnetic bias means magnetically urging said feeler member toward one of said positions, said magnetic bias means imposing a finite bias force on said feeler member in its other position, said magnetic bias means constituting the dominating feeler member movement influencing means of said device in both said feeler member positions, and switch means operative in response to movement of said feeler member to its said one position.

2. A sensing switch device as in claim 1 wherein said magnetic bias means comprises a magnetic element and a magnetized element, one of said elements being fixed and the other of said elements being mounted to move with said feeler member.

3. A sensing switch device as in claim 2 wherein said elements are arranged to be most distantly positioned from one another when said feeler member is in its said other position.

4. A sensing switch device as in claim 2 wherein said feeler member is mounted on a pivotally supported feeler arm and is counterbalanced by said other element.

5. A sensing switch device as in claim 2 wherein said switch means includes magnetic material forming said magnetic element.

6. A sensing switch device as in claim 5 wherein said switch means is magnetically actuable thereby to be operated by movement of said feeler member from one of its said positions to the other.

7. A sensing switch device as in claim 6 wherein said switch means comprises a magnetically actuable reed switch fixedly mounted and wherein said magnetized element is mounted to move with said feeler member.

8. A sensing switch device as in claim 7 wherein said feeler member is mounted on a pivotally supported feeler arm and is counterbalanced by said magnetized element.

9. A sensing switch device as in claim 7 wherein said feeler member, magnetized element and reed switch are relatively placed such that when said feeler element is in said one position, said magnetized element is closest to said reed switch and exerts maximum magnetic biasing force on said switch but is oriented such that its flux fails to couple the reed switch elements to a degree sufficient to close them, and when said feeler element is in said other position said magnetized element is displaced to exert a lesser, though dominant, magnetic bias on said reed switch, the displacement and positioning of said magnetized element in said other position being such that its flux, though diminished, is nevertheless directed in a manner to couple said reed switch elements to a degree sufficient to close them.

10. A sensing switch device as in claim 7 wherein said feeler member, magnetized element and reed switch are relatively placed such that when said feeler element is in said one position, said magnetized element is closest to said reed switch and oriented with respect to the reed switch such that its magnetic flux couples and closes the reed switch element and when said feeler element is in said other position said magnetized element is displaced to exert a lesser, though dominant magnetic bias on said reed switch, the displacement and positioning of said magnetized element in said other position being such that its flux fails to couple said reed switch elements to a degree sufficient to close them.

11. A sensing switch device according to claim 1 wherein said switch means comprises a stationary member positioned such that said feeler member moves back and forth along a given path with respect to said stationary member, a magnet mounted on one of said members and a magnetic reed switch mounted on the other member, the poles of said magnet and the reeds of said switch each being aligned generally parallel to the path of relative movement of said members and being of relative lengths such that they pass through a switch contact actuating positional relationship without substantial change in mutual magnet coupling whereby said switch contacts become opened and closed at substantially the same relative positional relationship between said switch and magnet irrespective of the direction of their relative movement.

12. A sensing switch device comprising a housing having a thin wall portion and a restricted opening formed in said thin wall portion, one longated feeler arm extending into said housing through said restricted opening, means located within said housing away from said opening pivotally supporting said feeler arm to pivot about an axis lying in the plane of said thin wall portion, and further means within said housing indicating the position of the portion of the feeler arm located therein.

13. A sensing switch device as in claim 12 wherein said further means comprises switch means arranged to be operated by movement of said feeler arm to a given position.

14. A sensing switch device as in claim 12 wherein said means pivotally supporting said feeler arm comprises a bracket having an extension pivotally secured within said housing at a location displaced from but coplanar with said thin wall portion, said bracket extending back from the plane of said thin wall portion and over to alignment therewith and there connected to said feeler arm.

15. A sensing switch device as in claim 14 wherein said bracket comprises a generally C-shaped element, the ends of which are pivotally journaled in the plane of said thin wall portion.

16. A sensing switch device as in claim 15 wherein said feeler arm and said C-shaped bracket are of wirelike construction and said feeler arm is secured to said C-shaped bracket substantially at the midpoint thereof within said housing.

17. A sensing switch device as in claim 12 wherein said housing includes on the outside thereof guide means defining a channel into and out from which said feeler element moves.

18. A sensing switch device as in claim 12 wherein said housing includes on the outside thereof filament guide means defining a first slot through which material to be sensed moves along in one direction and further defining a second, transverse, slot closely accommodating said feeler element, whereby movement of said feeler element in said second slot against said material is resisted by bending and shear stresses in said material.

19. A sensing switch device comprising a housing having a thin wall portion and a restricted opening formed in the thin wall portion, an elongated feeler arm extending into the housing through said restricted opening, means located within said housing and away from said opening pivotally supporting said feeler arm to pivot about an axis lying in the plane of said thin wall portion, a feeler member mounted on said feeler arm external to said housing means counterbalancing said feeler member to provide free movement of said feeler arm between first and second positions, magnetic bias means magnetically urging said feeler member toward one of said positions, said magnetic bias means imposing a finite bias force on said feeler member in its other position, said magnetic bias means constituting the sole feeler member movement influencing means of said device, and switch means operative in response to movement of said feeler member to its said one position.

References Cited
UNITED STATES PATENTS

| | | |
|---|---|---|
| 2,600,309 | 6/1952 | MacDonald et al. |
| 2,963,563 | 12/1960 | Patterson. |
| 3,057,977 | 10/1962 | Caswell. |
| 3,113,189 | 12/1963 | Porwancher. |
| 3,249,713 | 5/1966 | Briggs _____ 335—205 |
| 3,271,708 | 9/1966 | McCormick _____ 335—205 |

H. O. JONES, Primary Examiner

U.S. Cl. X.R.

200—61.41, 81; 335—205

PO-1050
(5/69)

UNITED STATES PATENT OFFICE
CERTIFICATE OF CORRECTION

Patent No. 3,462,569      Dated August 19, 1969

Inventor(s) Robert W. Schooley

It is certified that error appears in the above-identified patent and that said Letters Patent are hereby corrected as shown below:

Column 4, line 51, the word "passed" should be --passes--;

Column 5, line 69, the word "closed" should be --close--;

Column 8, line 72, the word "dones" should be --done--;

Column 11, line 19, delete the word "one" and substitute the word --an-- therefor;

SIGNED AND
SEALED
FEB 3 1970

(SEAL)
Attest:

Edward M. Fletcher, Jr.
Attesting Officer

WILLIAM E. SCHUYLER, JR.
Commissioner of Patents